United States Patent
Leiden et al.

(10) Patent No.: US 6,645,588 B1
(45) Date of Patent: Nov. 11, 2003

(54) COATING COMPOSITION

(75) Inventors: Leif Leiden, Anttila (FI); Markku Asumalahti, Kerava (FI); Jari Aarila, Porvoo (FI); Laila Rogestedt, Odsmal (SE); Hans-Bertil Martinsson, Varekil (SE); Bengt Hagstrom, Kungalv (SE); Aimo Sahila, Kerava (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/624,279

(22) Filed: Jul. 24, 2000

Related U.S. Application Data

(62) Division of application No. 08/981,845, filed as application No. PCT/FI96/00405 on Jul. 10, 1996, now abandoned.

(30) Foreign Application Priority Data

| Jul. 10, 1995 | (SE) | 9502508 |
| Jun. 7, 1996 | (FI) | 962366 |

(51) Int. Cl.$^7$ ............................................... F16L 9/147
(52) U.S. Cl. ..................... 428/35.8; 428/35.9; 138/145; 138/146; 138/143
(58) Field of Search ............................. 428/35.8, 35.9; 138/145, 146, 143

(56) References Cited

U.S. PATENT DOCUMENTS

| 4,211,595 A | * | 7/1980 | Samour | 156/187 |
| 4,307,209 A | | 12/1981 | Morita et al. | 525/240 |
| 4,390,666 A | | 6/1983 | Moriguchi et al. | |
| 4,438,238 A | | 3/1984 | Fukushima et al. | 525/240 |
| 4,547,551 A | | 10/1985 | Bailey et al. | |
| 5,279,864 A | * | 1/1994 | Ohkita et al. | 428/35.9 |
| 5,338,589 A | | 8/1994 | Böhm et al. | |
| 5,405,917 A | | 4/1995 | Mueller, Jr. et al. | |
| 5,539,076 A | | 7/1996 | Nowlin et al. | 525/240 |
| 5,882,750 A | | 3/1999 | Mink et al. | 525/240 |

FOREIGN PATENT DOCUMENTS

| EP | 0022376 A2 | 1/1981 |
| EP | 0 057 420 B1 | 5/1986 |
| EP | 0237294 B1 | 9/1987 |
| EP | 0318841 A3 | 6/1989 |
| EP | 0 369 436 A2 | 5/1990 |
| EP | 0533160 A1 | 3/1993 |
| EP | 0 603 935 B1 | 6/1994 |
| EP | 0 517 868 B1 | 11/1995 |
| EP | 0679704 A1 | 11/1995 |
| FI | 76822 | 8/1988 |
| GB | 942369 | 5/1962 |
| WO | 0 302 242 A1 | 8/1989 |
| WO | WO 9212182 A1 | 7/1992 |
| WO | WO 9422948 A1 | 10/1994 |
| WO | WO 9510548 A1 | 4/1995 |

* cited by examiner

*Primary Examiner*—D. R. Wilson
(74) *Attorney, Agent, or Firm*—Birch, Stewart, Kolasch & Birch, LLP

(57) ABSTRACT

Conventional coating compositions have the disadvantage of being insufficiently coatable and having an unsatisfactory environmental stress cracking resistance. Now a coating composition has been found which has both good coating processability and environmental stress cracking resistance. It comprises a multimodal ethylene polymer, which contains from 80 to 100% by weight of ethylene repeating units and from 0 to 20% by weight of $C_3$–$C_{10}$ α-olefin repeating units, has a density of between 0.915 g/cm$^3$ and 0.955 g/cm$^3$, and is a blend of at least a first ethylene polymer having a first average molecular weight and a first molecular weight distribution and a second ethylene polymer having a second average molecular weight, which is higher than said first average molecular weight, and a second molecular weight distribution, said blend having a third average molecular weight and a third molecular weight distribution.

1 Claim, No Drawings

COATING COMPOSITION

This application is a divisional of co-pending U.S. application Ser. No. 08/981,845, filed on Sep. 24, 1998, abandoned the entire contents of which is incorporated by reference. U.S. application Ser. No. 08/981,845 is a national stage application filed under 35 U.S.C. § 371 of prior PCT International Application No. PCT/FI96/00405, which has an international filing date of Jul. 10, 1996, which designated the United States of America, the entire contents of which is incorporated by reference.

The invention relates to a coating composition and its use for coating a solid substrate. Coatings are applied to surfaces of all types to provide protection and decoration. Protection may be required against corrosion, oxidative aging, weathering, or against mechanical damage.

When coating without solvent, the coating material should have good processing properties, i.e. the material should be easily melt coatable within a wide temperature interval, low shrinking, high mechanical strength, high surface finish and high environmental stress cracking resistance (ESCR). Since all these requirements have been difficult to fulfill, prior known coating materials have meant compromises whereby good properties in one sense have been achieved at the expense of good properties in another sense.

It would mean considerable advantages if the above mentioned compromise regarding the properties of a coating composition could be avoided. It would be particularly desirable to improve the coatability such as the melt flow properties when coating and the shrinkability of the coating material as well as the environmental stress cracking resistance of a product made from the coating material.

The purpose of the invention is to provide a coating material having good melt coating processability, low shrinking, high service temperature range and good environmental stress cracking resistance. The invention also strives for efficient coating speed expressed as high winding speed of the extruded material.

These purposes of the invention have now been achieved by means of a coating composition, which is substantially characterized in that it comprises a multimodal ethylene polymer, which contains from 80 to 100% by weight of ethylene repeating units and from 0 to 200% by weight of $C_3$–$C_{10}$ α-olefin repeating units, has a density of between 0.915 g/cm³ and 0.955 g/cm³, and is a blend of at least a fast ethylene polymer having a first average molecular weight and a first molecular weight distribution and a second ethylene polymer having a second molecular weight, which is higher than said first molecular weight, and a second molecular weight distribution, said blend having a third molecular weight and a third molecular weight distribution.

By a multimodal ethylene polymer is in connection with the present invention meant an ethylene polymer having broad molecular weight distribution produced by blending two or more ethylene polymer components with different molecular weights or by polymerizing ethylene to different molecular weights in a process with two or more reactors in series. By contrast, a unimodal ethylene polymer is obtained from only one ethylene polymer component produced in only one step.

The average molecular weights and the molecular weight distributions can be measured and expressed by any conventional method applied to ethylene polymer products. In this connection, it is convenient that the average molecular weights are measured and expressed as melt flow rates $MFR^i_m$, where i refers to said first, second and third average molecular weights and m refers to the load of the piston used for measuring the MFRs, which load in the following examples generally is 5.0 kg (m=5, see ISO 1133). The molecular weight distributions are conveniently expressed as flow rate ratios, $FRR^i_m1/_m2$, i.e. the ratios between high load $MFR^i$s and low load $MFR^i$s, where i refers to said first, second and third molecular weight distributions, and $m^1$ and $m^2$ refer to the high load, generally 21.6 kg (m=21), and low load, generally 5.0 kg (m=5) or 2.16 kg (m=2), respectively.

By Melt Flow Rate (MFR) is meant the weight of a polymer pressed through a standard cylindrical die at a standard temperature in a laboratory rheometer carrying a standard piston and load. Thus MFR is a measure of the melt viscosity of a polymer and hence also of its average molecular weight. The smaller the MFR, the larger is the average molecular weight. It is frequently used for characterizing a polyolefin, especially polyethylene, when the standard conditions $MFR_m$ are: temperature 190° C.; die dimensions 9.00 cm in length and 2.095 cm in diameter; load of the piston, 2.16 kg (m=2), 5.0 kg (m=5), 10.0 kg (m=10), 21.6 kg (m=21). See Alger, M. S. M., Polymer Science Dictionary, Elsevier 1990, p. 257.

By Flow Rau Ratio ($FRR_m1/_m2$) is meant the ratio between the melt flow rate ($MFR_m1$) measured at a standard temperature and with standard die dimensions using a heavy load ($_m1$) and the melt flow rate ($MFR_m2$) measured at the same temperature with the same die dimensions using a light load ($_m2$). Usually, for ethylene polymers, the heavy load $m^1$ is 21.6 kg ($m^1$=21) and the light load $m^2$ is 5.0 kg (m=5) or 2.16 kg ($m^2$=2) (ISO 1133). The larger the value of the $FRR_m1/_m2$, the broader is the molecular weight distribution.

The present invention is based on the finding that multimodal ethylene polymer has excellent coating application properties such as good processability and low shrinkage as well as superior environmental stress cracking resistance.

The coating composition according to the present invention is a multimodal ethylene polymer. The multimodal ethylene polymer is by definition a blend of at least two ethylene polymers having different molecular weights. According to an important embodiment of the present invention, said blend is the product of a polymerization process comprising at least two steps. In the process, said first ethylene polymer is prepared by polymerizing ethylene in the presence of a catalyst system in a first step and said second polymer is prepared by polymerizing ethylene in the presence of a catalyst system in a second step. Said steps can be performed in any order, whereby the ethylene polymer of each step is present in the following step or steps. However, it is preferential that said blend is the product of said polymerization process, wherein said first step is performed before said second step. This means, that first, an ethylene polymer having a lower average molecular weight is produced and then, in the presence of the lower molecular weight ethylene polymer, an ethylene polymer having a higher average molecular weight is produced.

The idea of the present invention can be realized with any kind of ethylene polymerization catalyst, such as a chromium catalyst, a Ziegler-Natta catalyst or a group 4 transition metallocene catalyst. According to one embodiment of the present invention, said blend forming the multimodal ethylene polymer is the product of a polymerization process in which said first step and/or said second step is performed in the presence of a catalyst system comprising a procatalyst based on a tetravalent titanium compound, such as a $TiCl_4$/$MgCl_2$/optional inert carrier/optional internal electron donor procatalyst, and a cocatalyst based on an organoaluminum compound, preferentially a $R_3Al$/optional external electron donor procatalyst wherein R is a $C_1$–$C_{10}$ alkyl. Typical catalyst systems art: e.g. prepared according to WO91/12182 and WO95/35323 which are herewith included by reference. A preferential single site polymerization catalyst system is that based on a group 4 (IUPAC 1990) metal metallocene and alumoxane.

When performing said polymerization process comprising at least two steps, one or more catalyst systems, which may be the same or different, can be used. It is preferential, if said blend is the product of said polymerization process, in which said catalyst system is added to said first step and the same catalyst system is used at least in said second step.

The most convenient way to regulate the molecular weight during the multistep polymerization of the present invention is to use hydrogen, which acts as a chain-transfer agent by intervening in the insertion step of the polymerization mechanism. Hydrogen may be added in suitable amounts to any step of the multistep polymerization. However, it is preferential that in said first step a hydrogen amount is used, leading to a melt flow rate $MFR^1_2$ of said first ethylene polymer of from 50 g/10 min. to 2000 g/min., most preferentially from 100 g/10 min. to 1000 g/10 min., provided that said first step is performed before said second step.

It is prior known to prepare multimodal and especially bimodal olefin polymers in two or more polymerization reactors in series. Such processes are exemplified by EP 040992, EP 041796, EP 022376 and WO92/12182 which are hereby included as reference concerning the preparation of the multimodal ethylene polymers for the claimed coating material. According to these references each of said polymerization steps can be performed in liquid phase, slurry or gas phase.

According to the present invention, it is preferential to perform said polymerization steps as a combination of slurry polymerization and gas phase polymerization. Preferentially said first step is a slurry polymerization and said second step a gas phase polymerization.

The slurry polymerization is preferentially performed in a so called loop reactor. The gas phase polymerization is performed in a gas phase reactor. The polymerization steps can optionally be preceded by a prepolymerization, whereby up to 20% by weight and preferentially 1–10% by weight of the total ethylene polymer amount is formed.

Above, the use of hydrogen to regulate the molecular weight of the ethylene polymers is mentioned. The properties of the ethylene polymers ran also be modified by adding a small amount of α-olefin to any of said polymerization steps. According to one embodiment of the present invention, said fast ethylene polymer has a $C_3$–$C_{10}$ α-olefin repeating unit content of from 0 to 10% by weight of said first ethylene polymer. Preferentially, in said second ethylene polymer, the $C_3$–$C_{10}$ α-olefin, such as 1-butene or 1-hexene, repeating unit content is from 1 to 25% by weight, most preferentially 2 to 15% by weight, of said second ethylene polymer.

When using only two steps in said polymerization process, the ratio between the first produced ethylene polymer having the $MFR^1_2$ defined above, and the second produced ethylene polymer, having a lower MFR, is between 20:80 and 80:20, preferentially between 30:80 and 60:40.

The above mentioned polymerization conditions of the different steps can be coordinated so that the blend produced is most suitable for the coating of a solid substrate. Thus, the following preferential properties of said multimodal ethylene polymer blend can be achieved.

According to a preferred embodiment of the present invention, the melt flow rate $MFR^3_2$ of said blend is between 0.1 and 50 g/10 min., more preferably between 0.1 and 20 g/10 min. According to a preferred embodiment, the $C_3$–$C_{10}$ α-olefin repeating unit content of said blend is from 0.2 to 20% by weight, more preferably from 0.5 to 15% by weight, of said blend. According to a preferred embodiment, the flow rate ratio $FRR^3_{21/5}$ of said blend is between 10 and 50, more preferentially between 15 and 40. Thereby, it is advantageous if the molecular weight distribution corresponding to said flow rate ratio shows several peaks or a broad peak lacking small fractions of extremely low and extremely high molecular weight material.

As was described above, the multimodal ethylene polymer according to the invention can be produced in a polymerizing process having at least two steps leading to different average molecular weights. According to another important embodiment of the invention, the multimodal ethylene polymer can be produced by mixing at least two ethylene polymers having different average molecular weights. In the latter case, said blend is a mechanical mixture of at least said first ethylene polymer and said second ethylene polymer, preferentially a mechanical mixture of said fast ethylene polymer and said second ethylene polymer.

When mixing two ethylene polymers of different average molecular weight, the mixing is generally a melt mixing in a melt processing apparatus like a compounder and an extruder. The product is then a mechanical melt mixture of at least said first ethylene polymer and said second ethylene polymer. Preferentially there are only two ethylene polymers so that the mechanical melt mixture is a mixture of said fast ethylene polymer and said second ethylene polymer. The preferable ratio between said first ethylene polymer and said second ethylene polymer is between 20:80 and 80:20, most preferably between 20:80 and 60:40.

When feeding the first ethylene polymer to the mixing step, the melt flow ratio $MFR^1_2$ of the first ethylene polymer is preferentially from 50 to 2000 g/ 10 min., most preferentially from 100 to 1000 g/10 min. When feeding at least said second ethylene polymer to the mixing step, its or their melt flow ratio $MFR^{2, etc.}_{21}$ is preferentially from 0.05 to 50 g/10 min., most preferentially from 0.10 to 20 g/10 min.

In its most wide scope, the present invention relates to a coating composition comprising any multimodal ethylene polymer. This means, that the different ethylene polymers which can be used can have the monomer composition of a homopolymer or a copolymer. Preferably said first ethylene polymer has a $C_3$–$C_{10}$ α-olefin repeating unit content of 0.0 to 10% by weight, calculated from the weight of said ethylene polymer.

Usually at least one ethylene polymer component of said blend is an ethylene copolymer containing a small amount of another α-olefin. Preferentially, said second ethylene polymer has a $C_3$–$C_{10}$ α-olefin, preferentially 1-butene or 1-hexene, repeating unit content of from 1.0 to 25% by weight and most preferentially from 2.0 to 15% by weight Typical other comonomers are 4-methyl-1-pentene and 1-octene. When a blend of more than two ethylene polymer components is used, the further ethylene polymer components can be either homopolymers or copolymers.

Conclusively, in the embodiment where the coating composition multimodal ethylene polymer is prepared by mixing at least a first ethylene polymer and a second ethylene polymer, the proportion of the first ethylene polymer and the second etc., ethylene polymer, the $MFR^1$, $MFR^2$, etc. of said ethylene polymers and $C_3$–$C_{10}$ α-olefin repeating unit content of said ethylene polymers are preferentially such that the $MFR^3_2$ of the blend obtained is between 0.1 and 50 g/10 min., preferentially between 0.1 and 20 g/10 min. Correspondingly, but independently, the $C_3$–$C_{10}$ α-olefin repeating unit content of the said blend is from 0.2 to 20% by weight, preferentially from 0.5 m 15% by weight The flow rate ratio $FRR^3_{21/5}$ of said blend is between 10 and 50, preferentially between 15 and 40.

The molecular weight distribution curve shows either several peaks or a broad peak lacking small fractions of extremely low and extremely high molecular weight material. It was found that, although the melt flow ratios, the comonomer repeating unit content and the flow rate ratio were essentially the same as in known mono-modal products, the mere fact that the ethylene polymer was multimodal, i.e. was the blend of different molecular weight fractions, rendered it totally superior e.g. with respect m the processability measured as winding speed and the environmental stress cracking resistance.

Above, a multimodal ethylene polymer suitable for a coating composition has been described, which is merely the product of multistep polymerization or mixing. The invention also relates to a coating composition, prepared by a combination of multistep polymerization and mixing, e.g. by polymerizing ethylene in two or more steps and mixing the product with one or more ethylene polymers. Also, the finished polymerization or mixing product can further be treated m modify its average molecular weight and molecular weight distribution.

According to one embodiment of the present invention said blend is a blend which has been treated in a tailoring step comprising heating, melt processing and subjecting of a multimodal ethylene polymer to controlled radical reactions to give a molecular weight, which is at least as high as the molecular weight of the untreated blend, and a molecular weight distribution, which is broader than the molecular weight distribution of the untreated blend.

Preferentially a said tailoring step leads to a relative decrease in the melt flow ratio $MFR_5$, $-(MFR^{3'}_5-MFR^3_5)$: $MFR^3_5$, is from 5 to 100%, preferentially from 10 to 80%, wherein $MFR^{3'}_5$ is the melt index of said blend after said tailoring step. The upper limits are not to be interpreted as limitations, but it has only a descriptive function, which is based on the experimental results obtained in connection with the present invention. Anyhow, it appears that the melt viscosity decreases by several tens of percent, which meant that the controlled free radical reactions essentially lead to the combination of radical fragments into larger ethylene polymer molecules than before the controlled free radical reactions.

Perhaps even more important is the effect of the tailoring step on the molecular weight distribution expressed as the flow rate ratio of the blend According to one embodiment of the invention, the relative broadening of the molecular weight distribution expressed as $+(FRR^{3'}_{21/5}-FRR^3_{21/5})$: $FRR^321/5$ is from 5 to 100%, preferentially from 10 to 80% wherein $FRR^{3'}_{21/5}$ is the flow rate ratio of said blend after said tailoring step.

The free radical reactions of said tailoring step can be effected in many ways. Firstly, free radicals may be generated from initiators in diverse ways, among which thermal or photochemical intermolecular bond cleavage, redox reactions, and photochemical hydrogen abstraction are the most common, but other processes such as the use of γ-radiation or electron beams and application. Free radicals can also be generated by means of reaction of the ethylene polymer blend by means of thermal decomposition with or without the presence of oxygen. Thermal treatment is a suitable method, especially if unstabilized or partly stabilized polyethylene is used or if the used ethylene polymer is destabilized during the treatment.

One of the main obstacles for using ethylene polymers as coating materials has up to now been an unsatisfying environmental stress cracking resistance. Another obstacle has been the poor melt coating processability of ethylene polymers. In the present invention, the finding that multimodal ethylene polymer has a totally superior environmental stress cracking resistance and melt coating processability, has lead to a new coating material which is the technical and commercial consequence of said finding. Thus the coating composition of the present invention preferentially has an environmental stress cracking resistance (ESCR, F20) (ASTM 1693/A, 10% Igepal) of at least 100 h, more preferentially at least 300 h, yet more preferentially at least 1000 h and most preferentially 2000 h.

In principle the claimed coating composition is suitable for any solid substrate such as a particle, powder, a corn, a grain, a granula, granulate, an aggregate, a fiber, a film, a bladder, a blister, a coat, a coating, a cover, a diaphragm, a membrane, a skin, a septum, a serving, a foil, a web, a cloth, a fabric, a canvas, a textile, a tissue, a sheet, a board, a cardboard, a carton, a fiber board, a paperboard, a pasteboard, a disc, a laminate, a layer, a planchette, a plate, a slab, a slice, a spacer, a wafer, a tape, a belt, a lace, a ribbon, a slip, a string, a strip, a band, a rope, a filament, a file, a fillet, a thread, a wire, a cable wire, a wire cable, a wire role, a yarn, a cable, a conduit, a cord, a duct, a line, a rope, a hawser, a body, a block a part, a moulding, a workpiece, a fabricated shape, a form part a formed piece, a mould shape, a shaped piece, a special casting, a special piece, a bar, a lever, a boom, a pole, a rod, a shaft, a shank a spoke, a staff an arm, a gripe, a helve, a pin, a rein, a spindle, a staff, a stalk, a stem, a tube, a hose, a hose pipe, a sleeve, a barrel, a canal, a pipe, a spout, a valve, a profile.

Preferentially the claimed coating composition is a coating material for a solid substrate made of metal such a iron, steel, noble metals, metal alloys, composition metals, hard metals, cintered metals, cermets, or from non-metals such as concrete, cement, mortar, plaster, stone, glass, porcelain, ceramics, refractory materials, enamel, wood bark, cork, paper and paperboard textile, leather, rubber and caoutchouc, plastics, and bituminous materials.

Most preferentially the claimed coating composition is a coating material for a rigid solid substrate, preferentially a rigid pipe, a rigid pipe fitting or a rigid profile, most preferentially an iron or steel pipe, pipe fitting or profile. In more detail, such a pipe is an iron or steel pipe, having a primer like an epoxy lacquer covering the steel surface and a coupling agent like carboxy modified polyethylene coveting said primer. The claimed coating composition is then attached to the layer of carboxy modified polyethylene.

In addition to the above described coating composition, the present invention also relates to the process for the preparation of said coating composition, thereby the claimed process is as described above.

The invention also relates to the use of a coating composition according to the above description or prepared by the claimed process for the coating of a solid substrate such as a particle, powder, a corn, a grain, a granule, granulate, an aggregate, a fiber, a film, a bladder, a blister, a coat, a coating, a cover, a diaphragm, a membrane, a skin, a septum, a serving, a foil, a web, a cloth, a fabric, a canvas, a textile, a tissue, a sheet, a board, a cardboard, a carton, a fiber board, a paperboard a pasteboard, a disc, a laminate, a layer, a planchette, a plate, a slab, a slice, a spacer, a wafer, a tape, a belt, a lace, a ribbon, a slip, a string, a strip, a band a rope, a filament, a file, a fillet, a thread, a wire, a cable wire, a wire cable, a wire rope, a yam, a cable, a conduit, a cord, a duct, a line, a rope, a hawser, a body, a block, a part, a moulding, a workpiece, a fabricated shape, a form part, a formed piece, a mould shape, a shaped piece, a special casting, a special piece, a bar, a lever, a boom, a pole, a rod a shaft, a shank, a spoke, a staff an arm, a gripe, a helve, a pin, a rein, a spindle, a staff, a stalk, a stem, a tube, a hose, a hose pipe, a sleeve, a barrel, a canal, a pipe, a spout, a valve, a profile.

Preferentially the use is directed to the coating of a solid substrate made of metal such as iron, steel, noble metals, metal alloys, composition metals, hard metals, cintered metals, cermets, or of non-metals such as concrete, cement, mortar, plaster, stone, glass, porcelain, ceramics, refractory materials, enamel, wood, bark, cork, paper and paperboard textile, leather, rubber and caoutchouc, plastics, and bituminous materials.

The use of the invention is most preferably directed to the coating a rigid solid substrate, preferentially a rigid pipe, a rigid pipe fitting or a rigid profile, most preferentially an iron or steel pipe, pipe fitting or profile. In the case of a coating a metal pipe like an iron or steel pipe with the coating composition according to the invention, the pipe is preferentially covered with a primer like an epoxy lacquer and the primer layer is then covered with a coupling agent layer like carboxy modified polyethylene, whereby the coating composition is deposited on said coupling agent layer.

In the following, a few examples are presented to illuminate the present invention. In the examples, bimodal polyethylene was prepared and tested. The preparations were as follows.

EXAMPLE 1

Bimodal polyethene #1 was polymerized with a Ziegler-Natta -type catalyst prepared according to FI 942945 in one loop and one gas phase reactor which were operated in series. Ethene was polymerized in the presence of hydrogen in the loop reactor resulting in $MFR_2=468$. Ethene was polymerized with 1-butene and hydrogen in the gas phase. The production rate split of reactors was 45%/55%. The final product $MFR_2=1.3$, $FRR_{21/5}=18$ and density 941 kg/m$^3$.

Bimodal polyethene #2 was polymerized with a Ziegler Natta -type catalyst in one loop and one gas phase reactor which are operated in series. Ethene was polymerized in presence of hydrogen in the loop reactor resulting in $MFR_2=444$. Ethene was polymerized with 1-butene and hydrogen in the gas phase reactor. The production rate split of reactors was 40%/60%. The final product $MFR_2=1.3$, $FRR_{21/5}=16$ and density 940 kg/m$^3$.

Reference material was commercial low shrinkage material HE6066 of Borealis.

EXAMPLE 2

Bimodal polyethene #3 was polymerized with a Ziegler-Nam-type catalyst prepared according to FI 942949 in one loop and one gas phase reactor which are operated in series. Ethene was polymerized in presence of hydrogen in the loop reactor resulting in $MFR_2=492$. Ethene was polymerized with 1-butene and hydrogen in the gas phase reactor. The production rate split of reactors was 45%/55%. The final product $MFR_2=0.4$, $FRR_{21/5}=21$ and density 941 kg/m$^3$.

Bimodal polyethene #4 was polymerized with a Ziegler-Natter-type catalyst in one loop and one gas phase reactor which are operated in series. Ethene was polymerized in presence of hydrogen in the loop reactor resulting in $MFR_2=53$. Ethene was polymerized with 1-butene and hydrogen in the gas phase reactor. The production rate split of reactors was 44%/56%. The final product $MFR_2=0.3$, $FRR_{21/5}=17$ and density 941 kg/m$^3$.

Reference material was commercial steel pipe coating material HE6060 of Borealis.

EXAMPLE 3

Bimodal polyethene #5 was polymerized with a Ziegler-Natty -type catalyst prepared according to FI 942949 in one loop and one gas phase reactor which are operated in series. Ethene was polymerized in the presence of hydrogen in the loop reactor resulting in $MFR_2=384$. Ethene was polymerized with 1-butene and hydrogen in the gas phase reactor. The production rate split of reactors was 45%/55%. The final product $MFR_2=0.5$. $FRR_{21/5}=19$ and base resin density 944 kg/m$^3$.

Bimodal polyethene #6 was polymerized with a Ziegler-Natter -type catalyst prepared according to FI 942949 in one loop and one gas phase reactor which are operated in series. The catalyst was prepolymerized before feeding into the loop reactor. The prepolymerization degree was 62 g/g. Ethene was polymerized in the presence of hydrogen in the loop reactor resulting in $MFR_2=274$. Ethene was polymerized with 1-butene and hydrogen in the gas phase reactor. The production rate split of loop and gas phase reactors was 48%/52%. The final product $MFR_2=0.5$, $FRR_{21/5}=20$ and base resin density 945 kg/m$^3$.

Bimodal polyethene #7 was polymerized with a Ziegler-Natter -type catalyst prepared according to FI 942949 in one loop and one gas phase reactor which are operated in series. Ethene was polymerized in the presence of hydrogen and 1-butene in the loop reactor resulting in $MFR_2=230$ and density 943 kg/m$^3$. Ethene was polymerized with 1-butene and hydrogen is the gas phase reactor. The production rate split of reactors was 43%/57%. The final product $MFR_2=0.5$, $FRR_{21/5}=19$ and base resin density 927 kg/m$^3$.

The main end product properties of examples 1–2 are shown in tables 1 and 2. Table 1 shows a comparison between the coating materials #1 and #2 according to the invention and a commercial material (HE6066). As can be seen from table 1, the environmental stress cracking resistance and winding speed of the coating material according to the invention are outstanding comparing to corresponding conventional coating material.

TABLE 1

Properties of bimodal polyethene materials compared to existing commercial materials

| MATERIAL | Polyethene #1 | Polyethene #2 | HE6066 |
|---|---|---|---|
| $MFR_2$ (g/10 min.) | 1.3 | 1.3 | 2.0 |
| $FRR_{21/5}$ | 18 | 16 | 11 |
| Mw | | | |
| Mw/Mn | | | |
| DENSITY (kg/m$^3$) | 941 | 940 | 941$_{base\ resin}$ |
| ESCR, F20 (h) | >2000 | >2000 | 106 |
| Shrink., 100° C./24 h (%)[1] | 0.45 | 0.6 | 1 |
| Tensile at yield (MPa) | 21 | 21 | 20 |
| Winding speed, max (m/min.)[2] | 42 | 42 | 6 |

[1]Cable line 210° C. and 75 m/min.
[2]Demag coating line: screw Ø 45 mm, L/D = 24, die width = 450 mm, die gap = 0,5 mm.

Table 2 shows a comparison between coating materials #3 and #4 according to the present invention and a corresponding commercial coating material (HE6060). As can be seen from table 2, the materials according to the present invention are superior over conventional coating materials also at lower $MFR_2$ level.

TABLE 2

Properties of bimodal polyethene materials compared to existing commercial materials, $MFR_2 \sim 0.3$ g/10 min

| MATERIAL | Polyethene #3 | Polyethene #4 | HE6060 |
|---|---|---|---|
| $MFR_2$ (g/10 min.) | 0.4 | 0.3 | 0.29 |
| $MFR_5$ (g/10 min.) | 1.7 | 1.2 | 1.3 |
| $MFR_{21}$ (g/10 min.) | 34 | 20 | 22.0 |
| $FRR_{21/5}$ | 20 | 17 | 17 |
| Mw | | | 217000 |
| Mw/Mn | | | 13.1 |
| DENSITY (kg/m³) | 941 | 941 | 937.3$_{base\ resin}$ |
| ESCR, F20 (h) | >2000 | >2000 | |
| Shrink., 100° C./24 h(%)[1] | 0.9 | 1.1 | — |
| Tensile at yield (MPa) | 21 | 23 | |
| Winding speed, max (m/min.)[2] | 37 | 40 | 4–10 |

[1]Cable line 210° C. and 75 m/min.
[2]Demag coating line: screw Ø 45 mm, L/D = 24, die width = 450 mm, die gap = 0,5 mm.

TABLE 3

Processability behaviour of reference material HE6060 and Polyethene #5, #6 and #7 were tested on Barmag Ø 60 mm, L/D extruder having 240 mm wide flat die with die gap 1.5 mm. Extruder screw speed was 85 rpm.

| MATERIAL | Melt temp., ° C. | Current, A | Pressure, bar |
|---|---|---|---|
| HE6060 (ref.) | 270 | 42 | 379 |
| Polyethene #5 | 266 | 38 | 341 |
| Polyethene #6 | 269 | 37 | 342 |
| Polyethene #7 | 256 | 42 | 368 |

One can see that is spite of higher melt temperature, the power consumption and die pressure of reference material was high indicating worse processability compared to materials related in this invention.

A very important characteristics of coating material is maximum winding speed of material and thus maximum output rate of the extender. Table 4 shows that at least 67% higher line speed can be achieved with materials of this invention compared to reference material HE6060. Note that further increase of winding speed from 25 m/min is limited by equipment not by break off of Polyethene #5, #6 and #7 films.

TABLE 4

Maximum winding speed of example 3 materials on Barmag Ø 60 mm, L/D = 24 extruder. Die width was 240 mm and die gap 1.5 mm. Cast film was applied on the Ø 150 mm epoxy/adhesive precoated steel pipe.

| MATERIAL | Maximum winding speed, m/min | Output, kg/m³ |
|---|---|---|
| HE6060, reference | 15 | 36 |
| Polyethene #5 | ≧25 | ≧51.8 |
| Polyethene #6 | ≧25 | ≧50.9 |
| Polyethene #7 | ≧25 | ≧54 |

What is claimed is:

1. A pipe comprising an inner layer and an outer layer, where the inner layer comprises an iron or steel layer, an epoxy primer and a coupling agent covering said primer, and the outer layer comprises a melt coating polymer composition which comprises a multimodal ethylene polymer, which contains from 80 to 99.8% by weight of ethylene repeating units and from 0.2 to 20% by weight of $C_3$–$C_{10}$ α-olefin repeating units, has a density of between 0.941 g/cm³ and 0.955 g/cm³, and is a blend of at least a first ethylene polymer having a first average molecular weight corresponding to a melt flow rate $MFR^1_2$ of from 50 g/10 min. to 2000 g/10 min. and a first molecular weight distribution and a second ethylene polymer having a second average molecular weight corresponding to a lower melt flow rate than said first ethylene polymer, wherein said blend is the product of a polymerization process comprising at least two steps in which said first ethylene polymer is prepared by polymerizing ethylene in the presence of a catalyst system in a first step and said second ethylene polymer is prepared by polymerizing ethylene in the presence of a catalyst system in a second-step, said steps being performed in any order, the ethylene polymer of each step being present in the following step or steps, the ratio between the first and second ethylene polymer being from 80:20 to 20:80, said blend having a third average molecular weight corresponding to a melt flow rate $MFR^3_2$ of from 0.1 g/10 min. to 20 g/10 min. and a third molecular weight distribution.

* * * * *